(12) United States Patent
Hsu et al.

(10) Patent No.: US 10,966,560 B2
(45) Date of Patent: Apr. 6, 2021

(54) FULLY AUTOMATED COOKING SYSTEM

(71) Applicants: Po-Lin Hsu, Hualien County (TW); Chien-Yu Hsu, Hualien County (TW)

(72) Inventors: Po-Lin Hsu, Hualien County (TW); Chien-Yu Hsu, Hualien County (TW)

( * ) Notice: Subject to any disclaimer, the term of this patent is extended or adjusted under 35 U.S.C. 154(b) by 40 days.

(21) Appl. No.: 16/534,825

(22) Filed: Aug. 7, 2019

(65) Prior Publication Data
US 2021/0038011 A1 Feb. 11, 2021

(51) Int. Cl.
*A47J 27/00* (2006.01)
*A47J 44/00* (2006.01)

(52) U.S. Cl.
CPC .......... *A47J 27/002* (2013.01); *A47J 27/004* (2013.01); *A47J 44/00* (2013.01)

(58) Field of Classification Search
CPC .... A47J 37/108; A47J 37/1214; A47J 37/044; A47J 37/047; A47J 37/10; A47J 27/002; A47J 27/004; A47J 44/00
USPC ......... 99/331, 339, 352, 373, 404, 453, 483, 99/516; 426/231, 233, 241, 304, 407, 426/438
See application file for complete search history.

(56) References Cited

U.S. PATENT DOCUMENTS

2015/0373997 A1* 12/2015 Reinhart ................ A21B 5/023
99/352

* cited by examiner

*Primary Examiner* — Phuong T Nguyen
(74) *Attorney, Agent, or Firm* — Pai Patent & Trademark Law Firm; Chao-Chang David Pai

(57) ABSTRACT

A fully automated cooking system achieves unmanned and fully automated meal cooking through a mobile transport device, multiple cooking devices, multiple heating devices and other peripheral devices. The mobile transport device uses a circulating conveyor belt to form a cyclic travel path, along which a feeding station area, a heating station area, a discharging station area and a cleaning station area are defined. Each station area is provided with corresponding equipment, such as feeding device, heating device and cleaning device. Each cooking device includes a swivel mechanism disposed on the circulating conveyor belt, and a heating container coupled to the swivel mechanism. The heating container can stir the ingredients when heated and pour out food when cooking is complete. The heating device can be an electric heating device or a fuel gas heating device for heating the heating container to cook food, thereby achieving fully automated cooking.

12 Claims, 14 Drawing Sheets

FULLY AUTOMATED COOKING SYSTEM

BACKGROUND OF THE INVENTION

(a) Field of the Invention

The present invention relates to cooking technology and more particularly to a fully automated cooking system for feeding, cooking, cooked food discharging and cleaning through an automated production line.

(b) Description of the Prior Art

Many organizations and institutional groups today offer meals to their members, such as schools, hospitals, military, factories, etc. Since the organizations and institutional groups have a large number of members, the central kitchen must use a large amount of manpower for feeding and surrounding operations to provide enough meals in time, so labor costs are a big expense for such a central kitchen. Moreover, it is not easy for the current manpower cooking group meal to control the quality of the group meal because of the complex factors such as chef quality, cooking technology, seasoning control, fire control, and so on. Therefore, how to create a fully automated cooking technology through automatic control technology and equipment is a subject that the relevant industry must actively pursue.

SUMMARY OF THE INVENTION

The present invention has been accomplished under the circumstances in view. It is therefore the main object of the present invention to provide a fully automated cooking system capable of cooking food by a mobile transport device, a plurality of cooking devices disposed on the mobile transport device, and a plurality of heating devices for generating thermal energy. The standard of operation is streamlined and computerized throughout the process, thus achieving the goal of unmanned and fully automated cooking.

To achieve this and other objects of the present invention, a fully automated cooking system comprises a mobile transport device, a station area system, a plurality of cooking devices and a plurality of heating devices. The mobile transport device comprises a drive wheel set, a circulating conveyor belt extending around the drive wheel set, and a plurality of brackets disposed on the circulating conveyor belt. The drive wheel set drives the circulating conveyor belt to rotate. The circulating conveyor belt carries the brackets to make a horizontal loop movement. The station area system defines a feeding station area, a heating station area, a discharging station area and a cleaning station area at different locations. The cooking devices are respectively mounted on the brackets, each comprising a swivel mechanism disposed on one respective bracket and a heating container connected to the swivel mechanism. The cooking devices are driven by the brackets to move horizontally between the multiple station areas of the station area system. The swivel mechanism can drive the heating container to flip the cooked food at the discharging station area. The heating devices are set in the heating station area in the travel of the cooking devices. Each heating device can an electric heating device or a fuel gas heating device. The heating devices are adapted for transferring heat to the heating containers to heat cook the ingredients in the heating containers. In this way, the ability to fully automated cooking can be achieved.

It is another object of the present invention to provide a fully automated cooking system, which uses sprockets and a chain to constitute a mobile transport device, which can arrange the cooking process into an in-line loop process structure, a circular loop process structure or a triangular loop process structure to respond to the needs of the kitchen.

It is still another object of the present invention to provide a fully automated cooking system, which utilizes a power supply system to provide electric power to the swivel mechanism of each cooking device, enabling the swivel mechanism to drive the associate cooking container to reciprocate or unidirectionally rotate during heating, and to flip and rotate when cooking is complete so that the cooked food can be poured out.

It is still another object of the present invention to provide a fully automated cooking system, which utilizes a range hood and a cleaning system to achieve a fully automated maintenance of the cooking environment and the cleaning of the appliances.

It is still another object of the present invention to provide a fully automated cooking system, which can automatically and quantitatively add liquid foodstuffs and solid food materials to a heating container of a cooking device through a liquid feeding device and a solid feeding device to achieve automatic feeding.

It is still another object of the present invention to provide a fully automated cooking system, which can achieve pre-cooking and the like through a pre-cooking system.

DETAILED DESCRIPTION OF THE PREFERRED EMBODIMENTS

Figure 1:
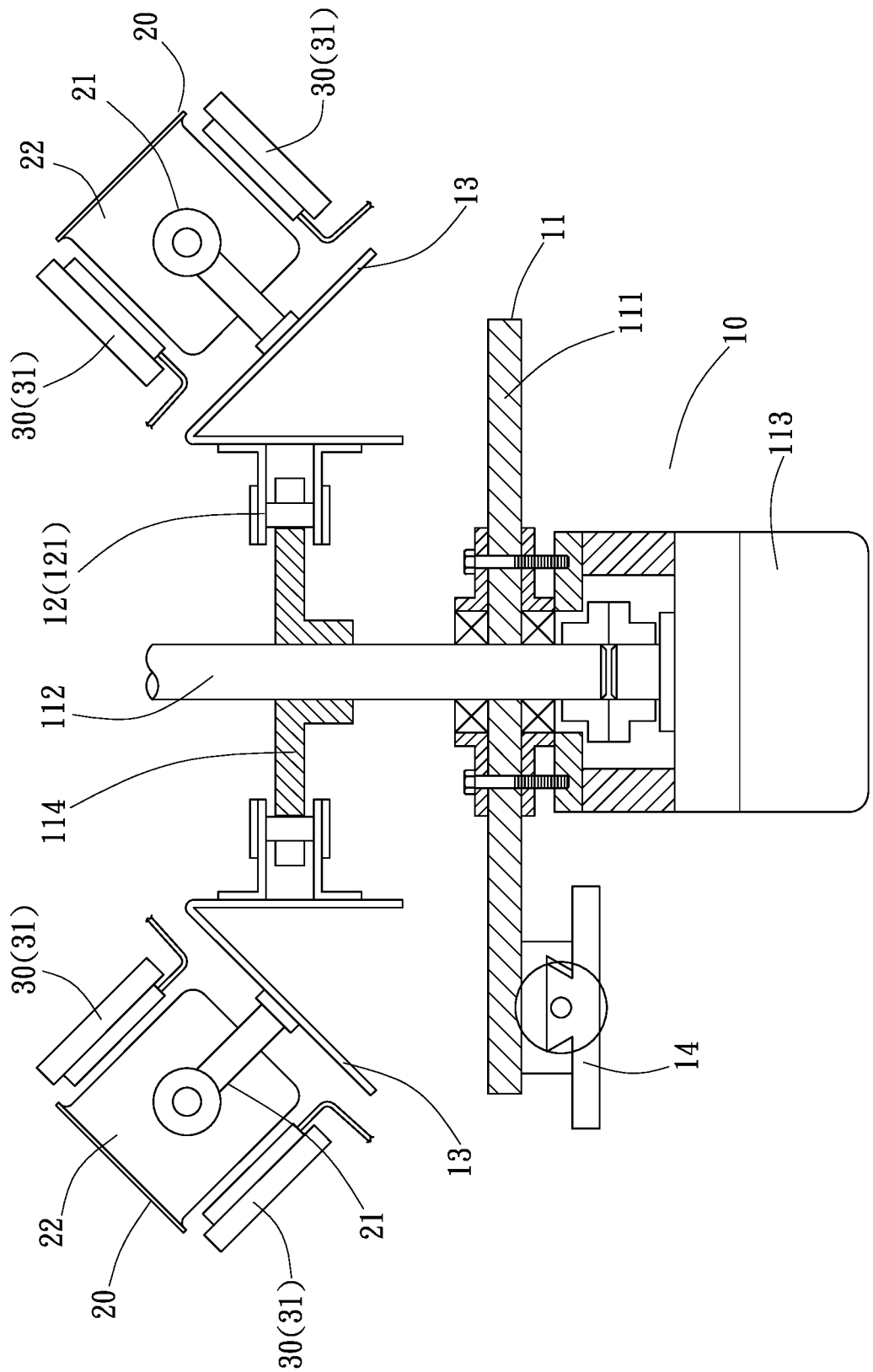
FIG. 1 is a schematic sectional view of a fully automated cooking system in accordance with the preferred embodiment of the present invention.
Figure 2:
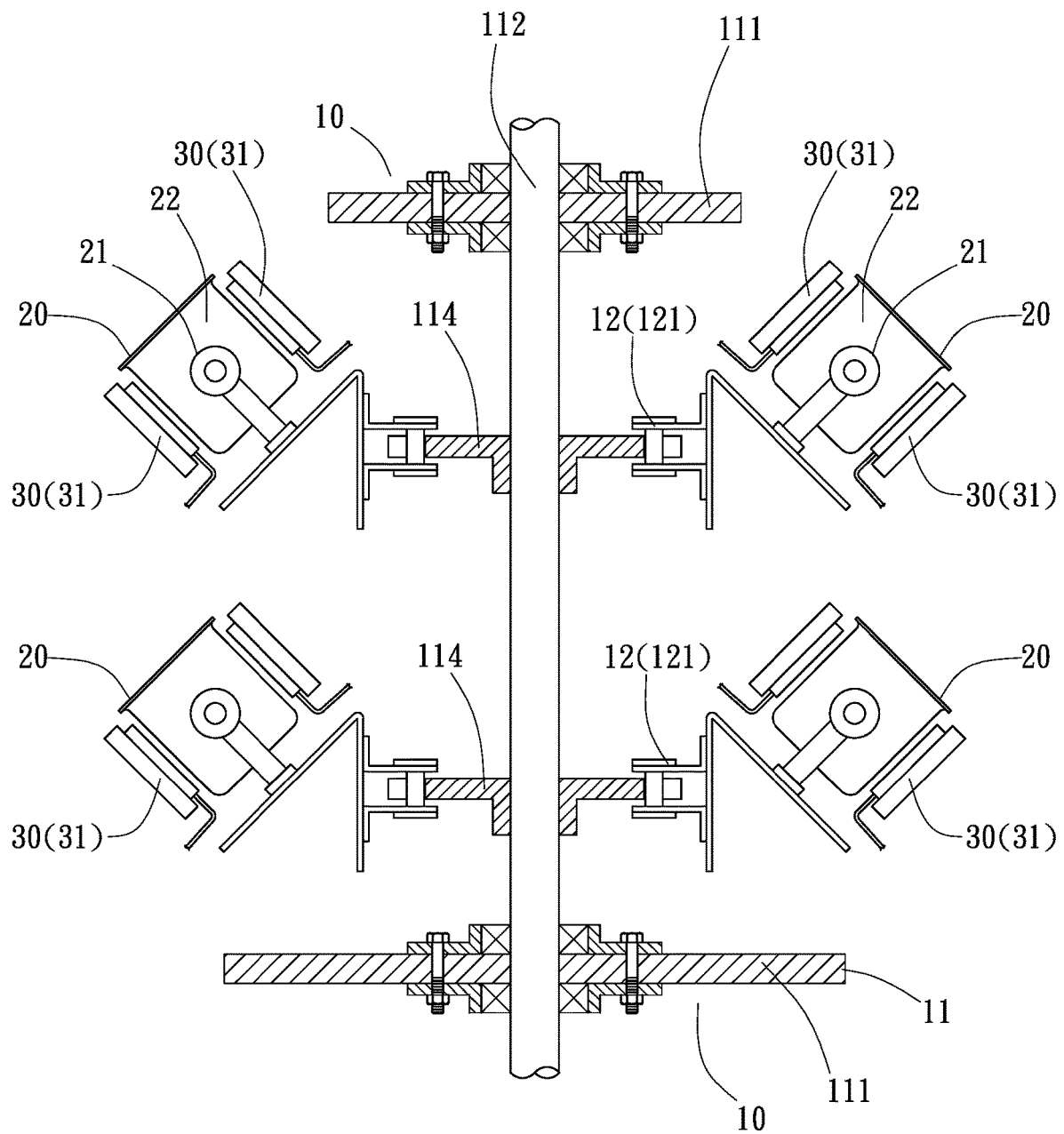
FIG. 2 is a schematic sectional view of a multi-layer fully automated cooking system in accordance with the present invention.

Referring to FIGS. 1 and 2, the fully automated cooking system of the present invention is a cooking system for fully automated cooking of food by performing, in an automatic cycle operation flow, the processes of automatic feeding (of cooking oil, spices, seasonings and ingredients), water adding, heating and cooking, cooked food pouring and container cleaning. The fully automated cooking system comprises at least one mobile transport device 10, a plurality of cooking devices 20, and a plurality of heating devices 30.

Figure 3:
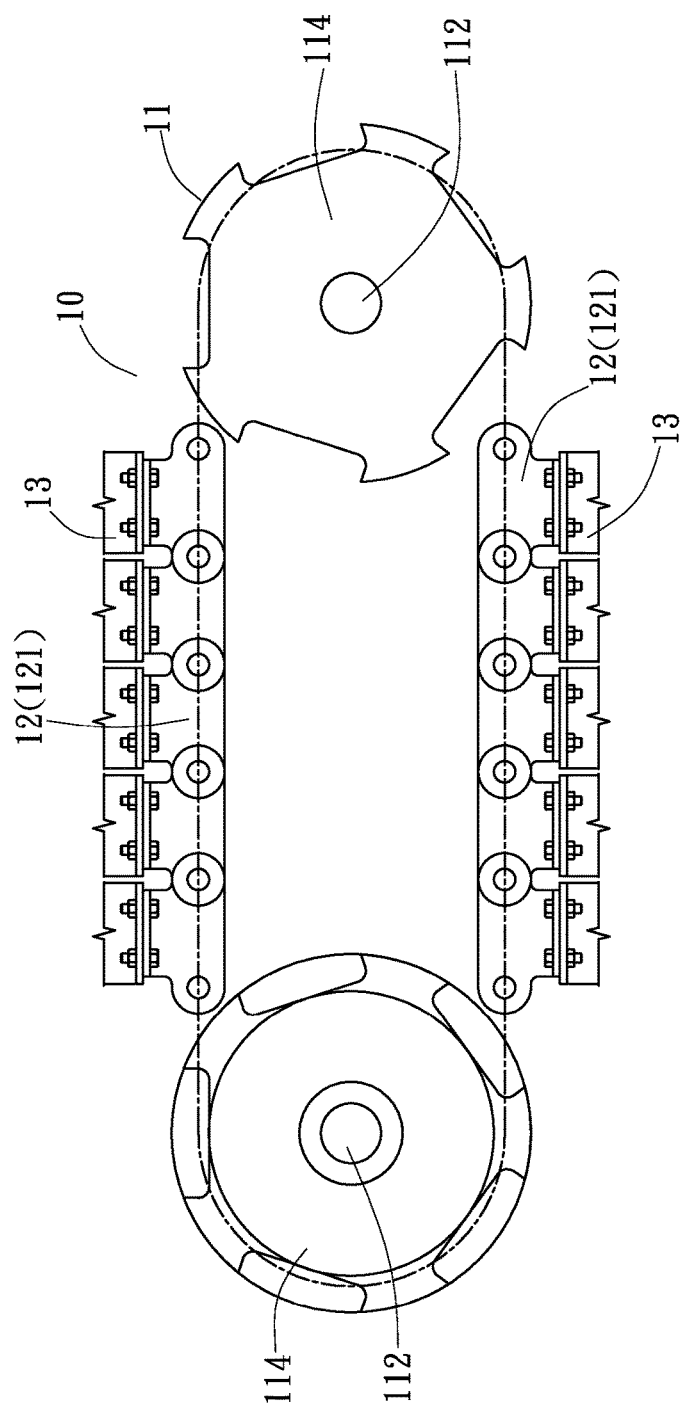
FIG. 3 is a schematic top view of the present invention, illustrating the structural arrangement of the drive wheel set and circulating conveyor belt of the mobile transport device.
Figure 4:
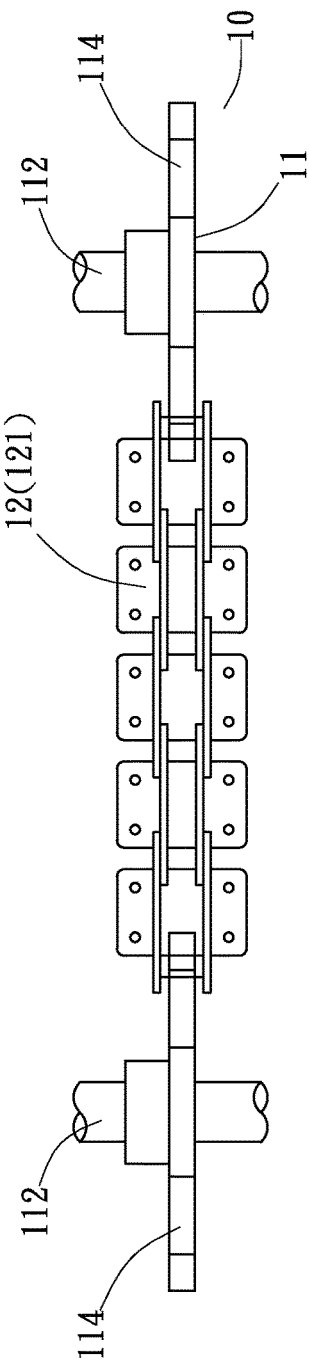
FIG. 4 is a schematic side view of the present invention, illustrating the structural arrangement of the drive wheel set and circulating conveyor belt of the mobile transport device.

Referring to FIG. 1, the present invention uses one single mobile transport device 10 to form a fully automated cooking system. As shown in FIG. 2, there may be two or more mobile transport devices 10 to form a multi-layer fully automated cooking system to achieve effective use of space and improve dining efficiency. Referring also to FIG. 3 and FIG. 4, the mobile transport device 10 mainly comprises a drive wheel set 11, a circulating conveyor belt 12 wound around the drive wheel set 11, and a plurality of brackets 13 disposed on the circulating conveyor belt 12. The drive wheel set 11 drives the circulating conveyor belt 12 to carry the brackets 13 to make a horizontal loop movement. The drive wheel set 11 comprises a base frame 111, a plurality of rotating shafts 112 rotatably mounted on the base frame 111, a first motor 113 coupled to the rotating shafts 112, and a plurality of sprockets 114 respectively mounted on the rotating shafts 112. The circulating conveyor belt 12 is a chain 121 wound around the sprockets 114. The brackets 13 are fastened to the chain 121. An adjustment device 14 is provided at one side or the bottom wall of the base frame 111 for adjusting the spacing between the rotating shafts 112. The adjustment device 14 can be a dovetail seat set, a T-shaped block set or a linear actuator, and the adjustment device 14 can be used to push two movably coupled base frames 111 by a motor or a hand wheel, thereby adjusting the spacing between the rotating shafts 112 and the chain 121 tightness.

Figure 5:
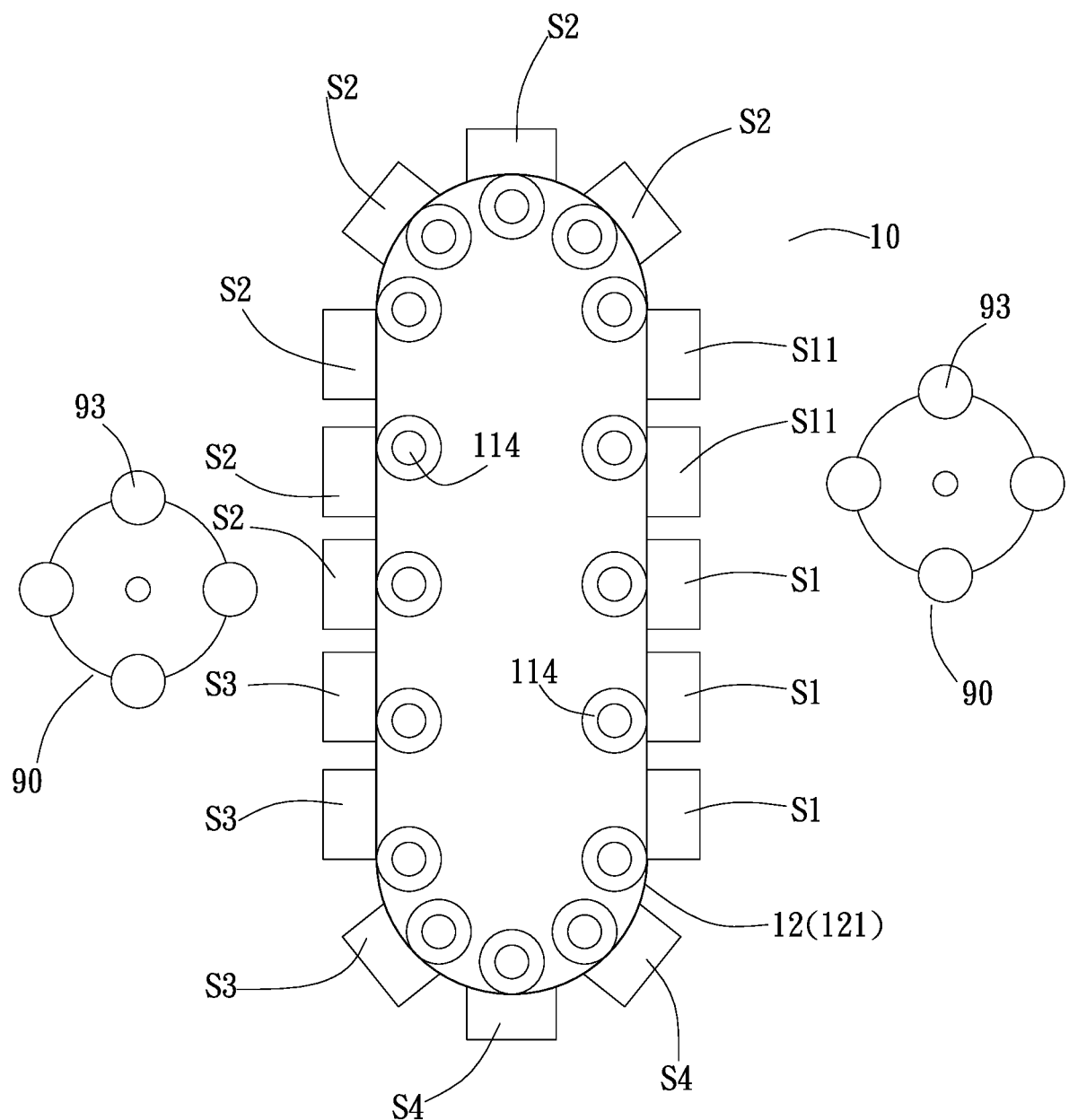
FIG. 5 is a schematic diagram of the in-line flow structure of the circulating conveyor belt of the mobile transport device of the present invention and the arrangement of the various station areas.
Figure 6:
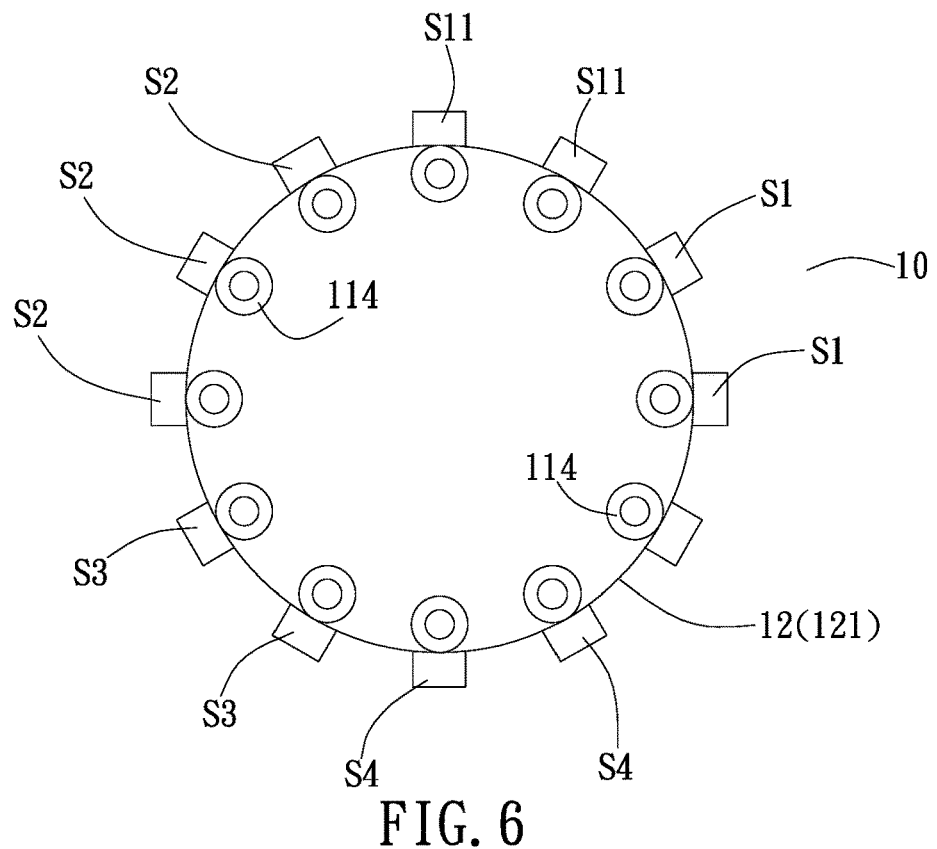
FIG. 6 is a schematic diagram of a circular flow structure of the circulating conveyor belt of the mobile transport device of the present invention and the arrangement of each station area.
Figure 7:
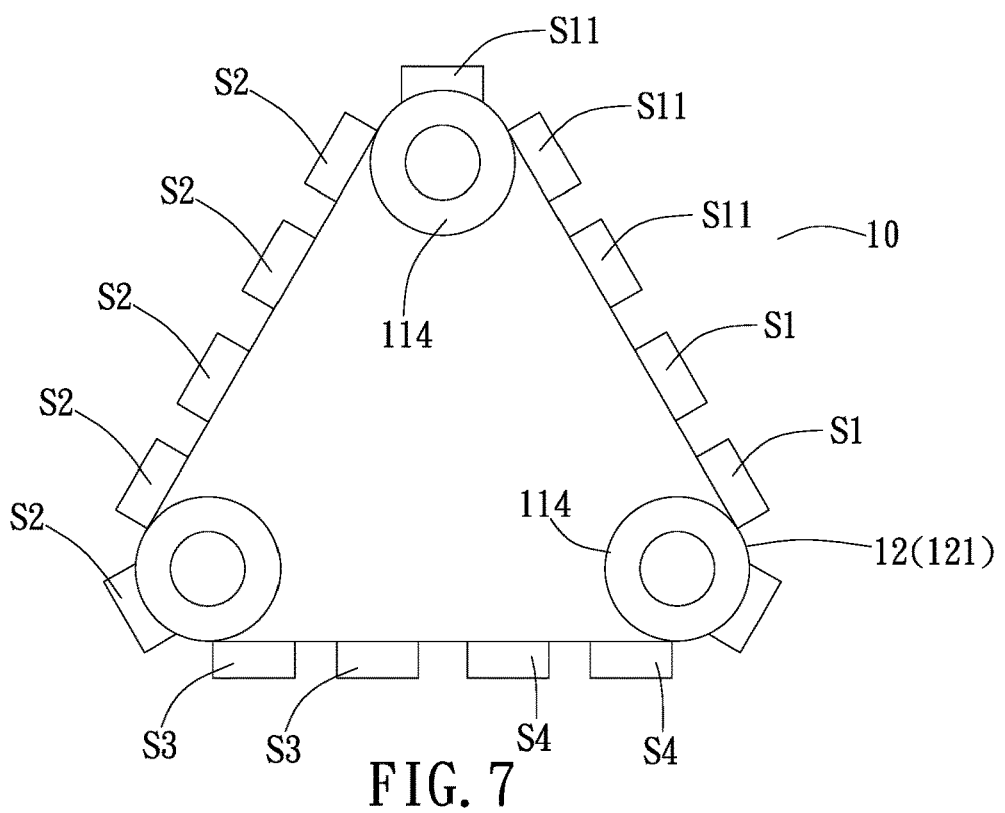
FIG. 7 is a schematic diagram of a triangular flow structure of the circulating conveyor belt of the mobile transport device of the present invention and the arrangement of each station area.
Figure 8:
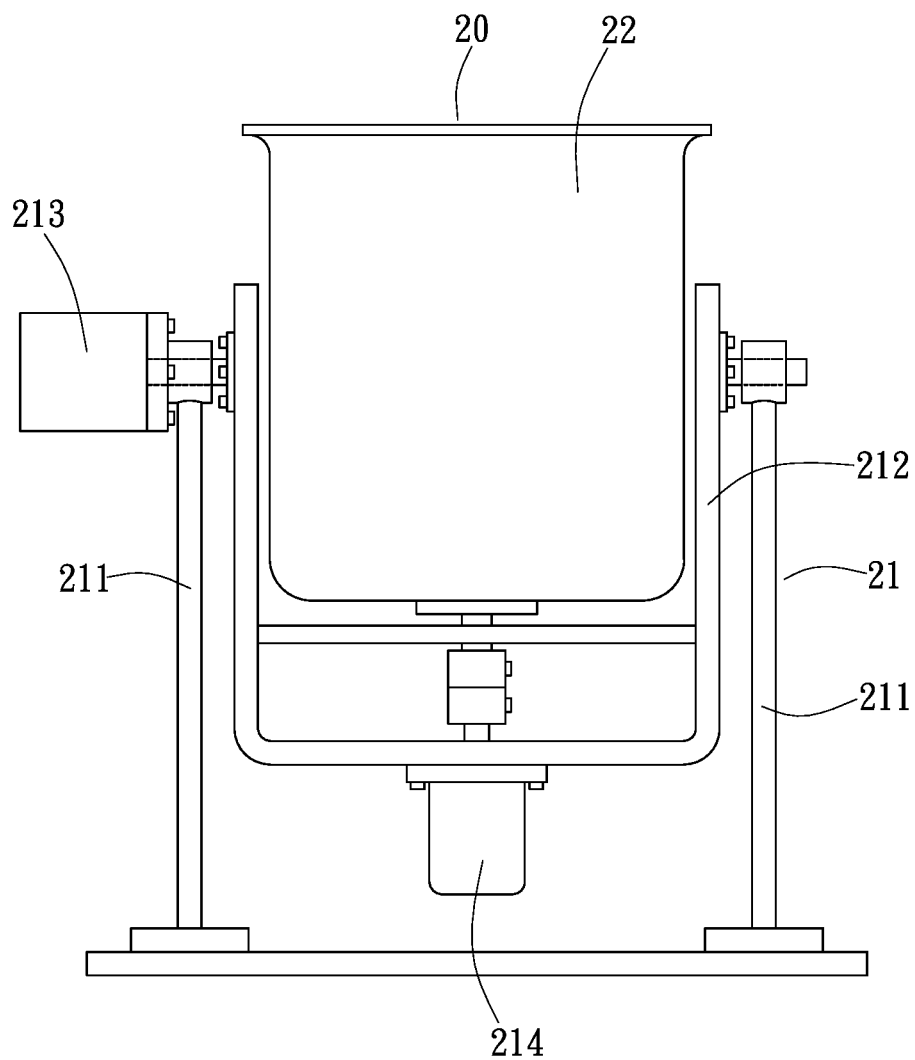
FIG. 8 is a schematic side view of a cooking device in accordance with the present invention.

The cooking devices 20 are devices that use containers to hold the foodstuffs into the cooking process, and the cooking devices 20 are horizontally circulated between multiple station areas by the brackets 13 of the mobile transport device 10 and can be stopped at each station area. As shown in FIG. 5, FIG. 6 and FIG. 7, the preferred embodiment of the station areas comprises a plurality of feeding station areas S1, a plurality of feeding preheating station areas S11, a plurality of heating station areas S2, one or multiple discharging station areas S3, and one or multiple cleaning station areas S4. Referring to FIG. 8, each of the cooking devices 20 mainly comprises a swivel mechanism 21 disposed on one respective bracket 13, and a heating container 22 coupled to the swivel mechanism 21. The swivel mechanism 21 can drive the heating container 22 to flip the cooked food at the discharging station area S3, and because the invention can continuously cycle and stop at a fixed point, thereby controlling the mealtime of each pot.

Figure 9:
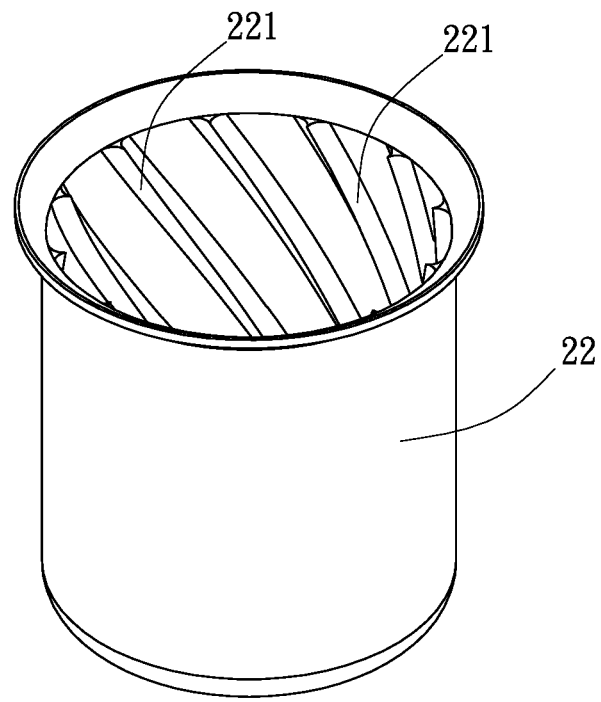
FIG. 9 is an oblique top elevational view of a cooking container in accordance with the present invention.
Figure 10:
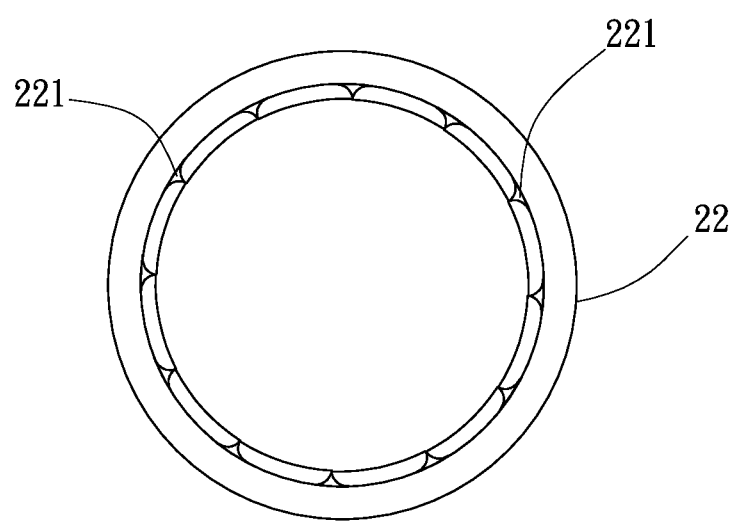
FIG. 10 is a top view of the cooking container shown in FIG. 9.

One of the specific embodiments of the swivel mechanism 21 comprises two cantilevers 211 disposed on the bracket 13, a flip frame 212 disposed between the two cantilevers 211, a second motor 213 for driving the flip frame 212, and a third motor 214 disposed at the bottom of the flip frame 212. The heating container 22 is rotatably disposed on the flip frame 212, and the third motor 214 drives the heating container 22 to rotate left and right or continuously in one direction. Referring to FIG. 9 and FIG. 10, the heating container 22 is a metal pot having a single or multi-spin spiral rib 221 formed on the inner wall thereof to cause different turning functions when the heating container 22 is intermittently rotated, for example, when the heating container 22 is turned leftward the spiral rib 221 turns the food downwardly inward, and on the contrary, when heating container 22 is turned rightward the spiral rib 221 turns the food upwardly outward, so that the oil, spices, seasonings and ingredients can be evenly heated and evenly blended. When the ingredients are cooked and carried to the discharging station area S3, the heating container 22 is turned down and then accelerated to rotate, so that the cooked food can be poured out quickly from the heating container 22 without sticking the pan.

Referring to FIG. 1 and FIG. 5 to FIG. 7, the heating devices 30 are devices for cooking the food in the heating containers 22. The heating devices 30 are respectively fixedly mounted in the heating station areas S2 and the feeding preheating station area S11. Each of the heating devices 30 can be an electric heating device 31 (see FIG. 11) or a fuel gas heating device 32 (see FIG. 12, FIG. 13 or FIG. 16). The heating device 30 provides heat to the heating container 22, thereby heating and cooking the ingredients in the heating container 22. The heating device 31 can be composed of a ceramic heating unit or other electric heating element. The fuel gas heating device 32 can be a gas furnace or a natural gas range.

Figure 11:
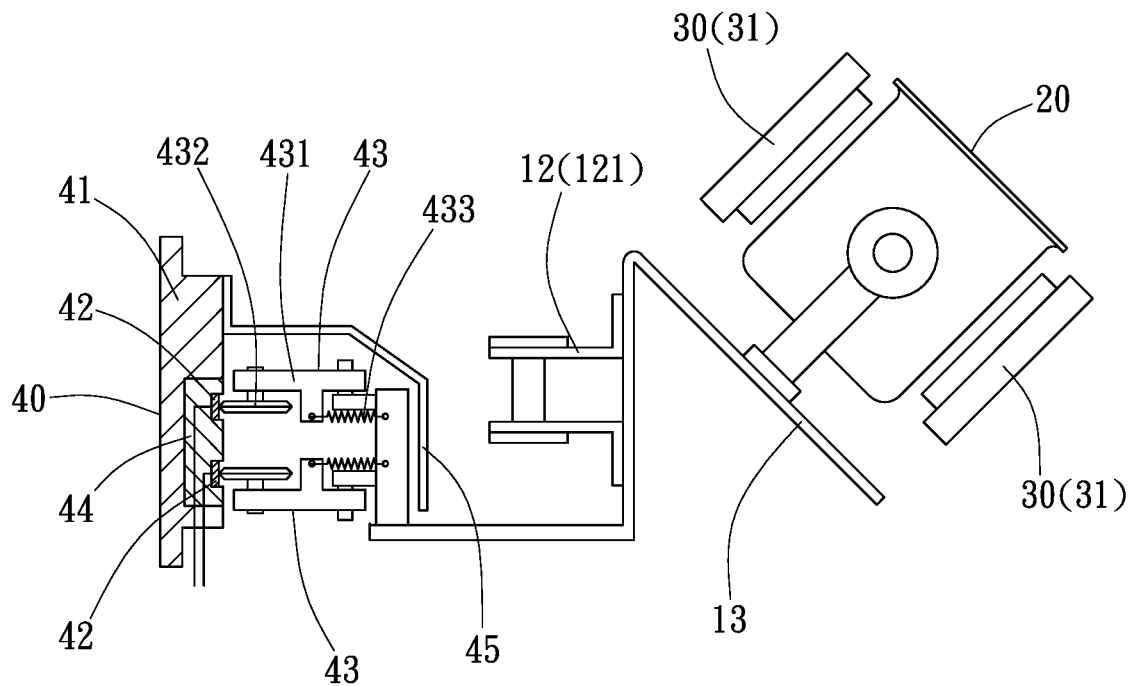
FIG. 11 is a schematic side view illustrating the arrangement of the power supply system in accordance with the present invention.
Figure 12:
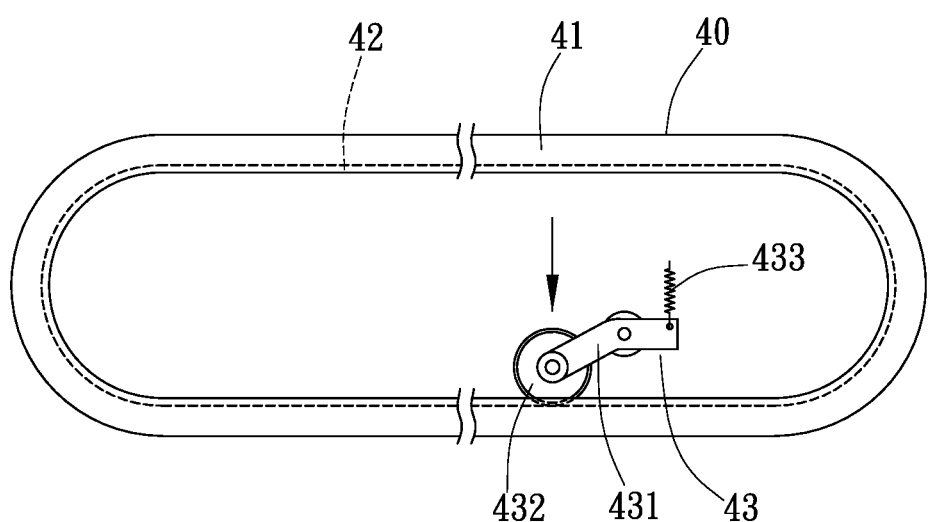
FIG. 12 is a schematic top view illustrating the arrangement of the power supply system in accordance with the present invention.

The cooking devices 20 are carried by the mobile transport device 10 to suspend in each station area and recirculated after each cooking operation, so the method of supplying power to the cooking devices 20 needs to be specially designed. Referring to FIG. 11 and FIG. 12, the preferred embodiment of the present invention further comprises a power supply system 40 to provide power to the cooking devices 20. The power supply system 40 comprises a track 41 extending parallel to the circulating conveyor belt 12, two electric strips 42 disposed on the top or one side of the track 41, two sets of conductive devices 43 disposed on the brackets 13, and a protective cover 45 covering the track 41, the electric strips 42 and the conductive devices 43. The track 41 may be provided with an insulator 44 to insulate the electric strips 42. The electric strips 42 are copper electric strips extended along the track 41. The conductive devices 43 each comprise a lever 431 pivotally disposed on the bracket 13, a copper conductive wheel 432 disposed at one end of the lever 431, and an elastic member 433 (for example, a tension spring, a compression spring, a torsion spring or a spring piece, etc.) acting upon the lever 431 to force the copper conductive wheel 432 into contact with one respective electric strip 42 in a rotatable manner, preventing generation of sparks due to poor contact. Further, an insulative structure is provided between the copper conductive wheel 432 and the lever 431. Thereby, the wires of the motors of the cooking devices 20 are connected to the copper conductive wheels 432 of the conductive devices 43, so that the power required for operation can be supplied through the copper conductive wheels 432 during movement.

Figure 13:
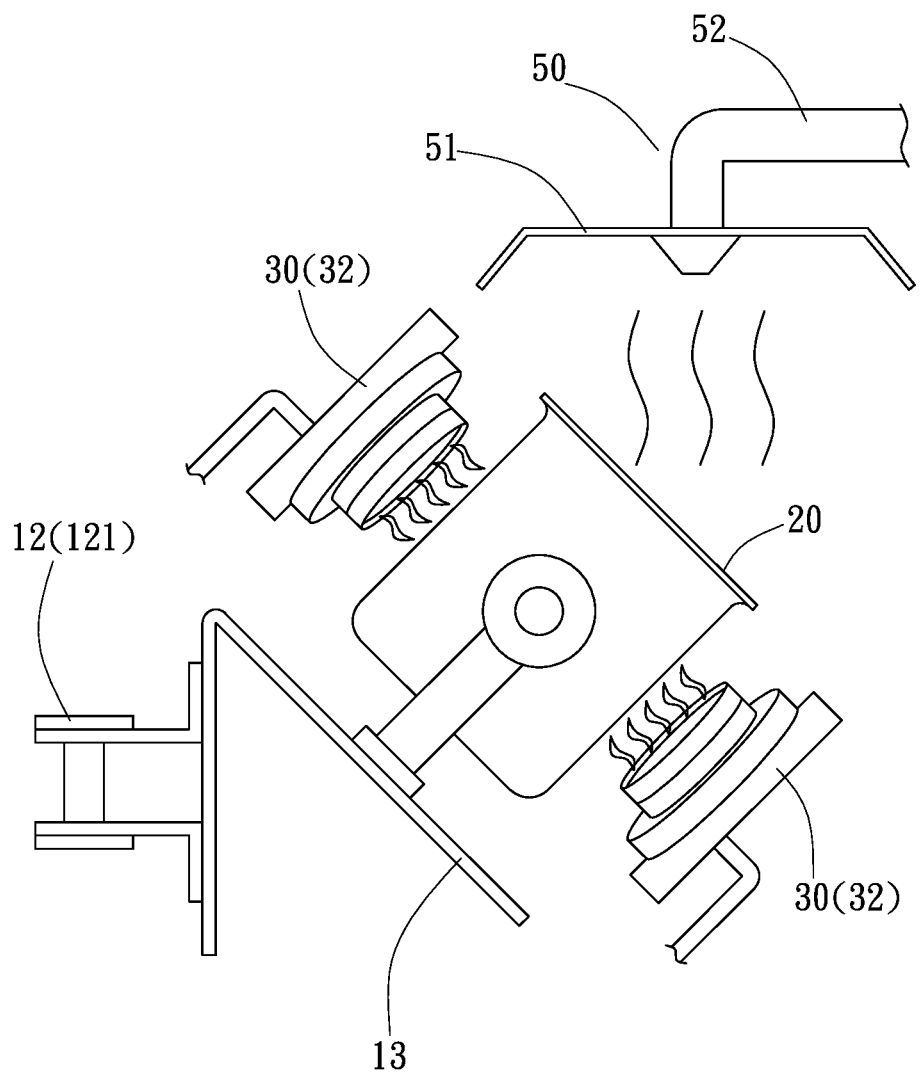
FIG. 13 is a schematic side view illustrating the arrangement of a fuel gas heating device and a range hood in accordance with the present invention.
Figure 14:
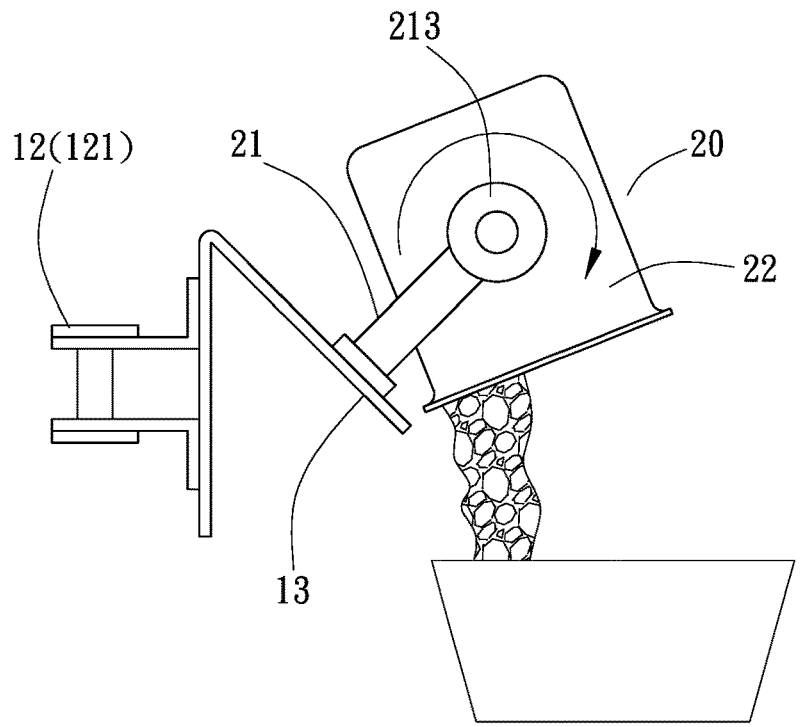
FIG. 14 is a schematic drawing of the present invention, illustrating the cooking container turned by the swivel mechanism and cooked food discharged out of the cooking container.
Figure 15:
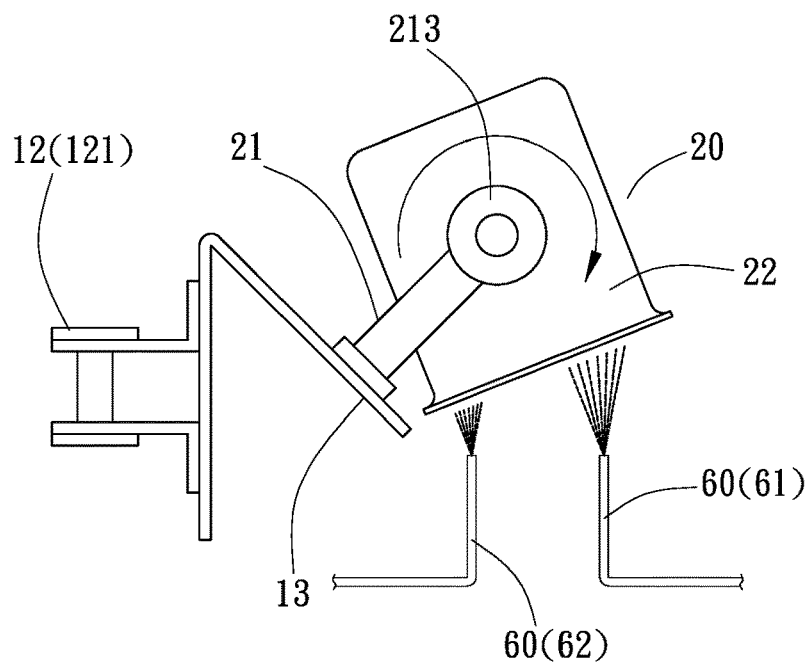
FIG. 15 is a schematic drawing of the present invention, illustrating the cleaning operation of the water spray pipe and jet pipe of the cleaning system.

Referring to FIG. 13, the preferred embodiment of the present invention further comprises a range hood 50. The range hood 50 comprises a fume hood 51, a fume exhaust pipe 52 and a fan (not shown) surrounding the circulating conveyor belt 12 for automatically discharging the fumes, and at least one cleaning system 60 installed in the at least one cleaning station area S4. The cleaning system 60 comprises at least a water spray pipe 61 and a jet pipe 62 facing the heating container 22, and other cleaning devices can be added as needed. When the heating container 22 discharges the cooked food in the discharging station area S3 (as shown in FIG. 14), the empty heating container 22 is brought to the cleaning station area S4 by the mobile transport device 10, and the water spray pipe 61 and jet pipe 62 of the cleaning system 60 are then operated to clean and air dry the empty heating container 22.

Figure 16:
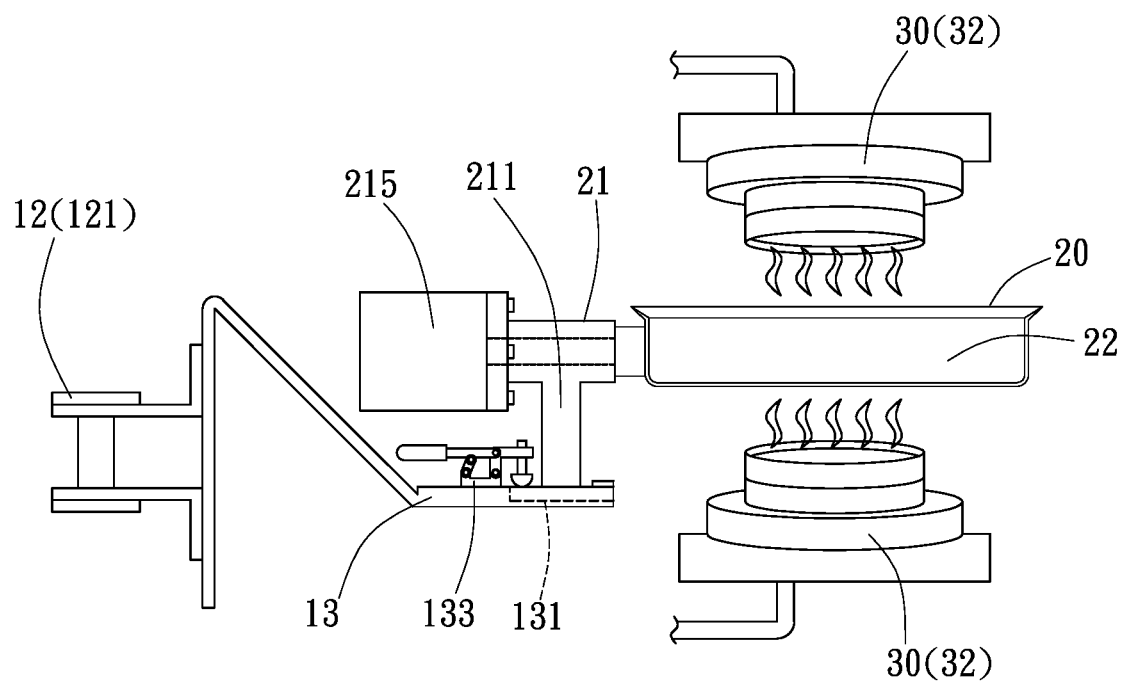
FIG. 16 is a schematic side view illustrating the cooking container of the present invention as a shallow frying pad and the swivel mechanism thereof.
Figure 17:
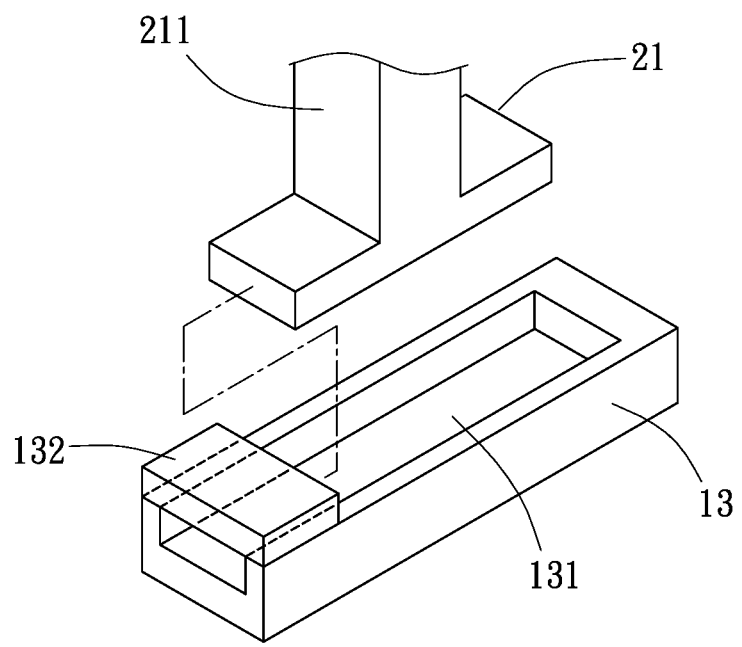
FIG. 17 is a schematic exploded view of the swivel mechanism quick-release structure of the present invention.

Further, in an alternate form of the present invention, as shown in FIG. 16, the heating container 22 of the present invention can also be implemented as a shallow bottom frying pan, and the swivel mechanism 21 comprises a cantilever 211 disposed on the bracket 13 and a fourth motor 215 mounted on the cantilever 211. Thereby, the shallow bottom frying pan is rotatably disposed on the cantilever 211, so that the fourth motor 215 can drive the shallow bottom frying pan to pour out the cooked or baked food. Referring to FIG. 16 and FIG. 17, the shallow bottom frying pan or the above heating container 22 may need to be brushed or replaced. To this end, the present invention can implement the cantilever 211 and the heating container 22 (as shown in FIG. 8) and the bracket 13 as quick-release structure. The bracket 13 is provided with an insertion slot 131, a stop block 132 and a quick-release clamp 133, so that one end of the base frame of the cantilever 211 is engaged with the insertion slot 131 and the stop block 132, and the other end is clamped by the quick-release clamp 133 to achieve the effect of quick replacement.

Figure 18:
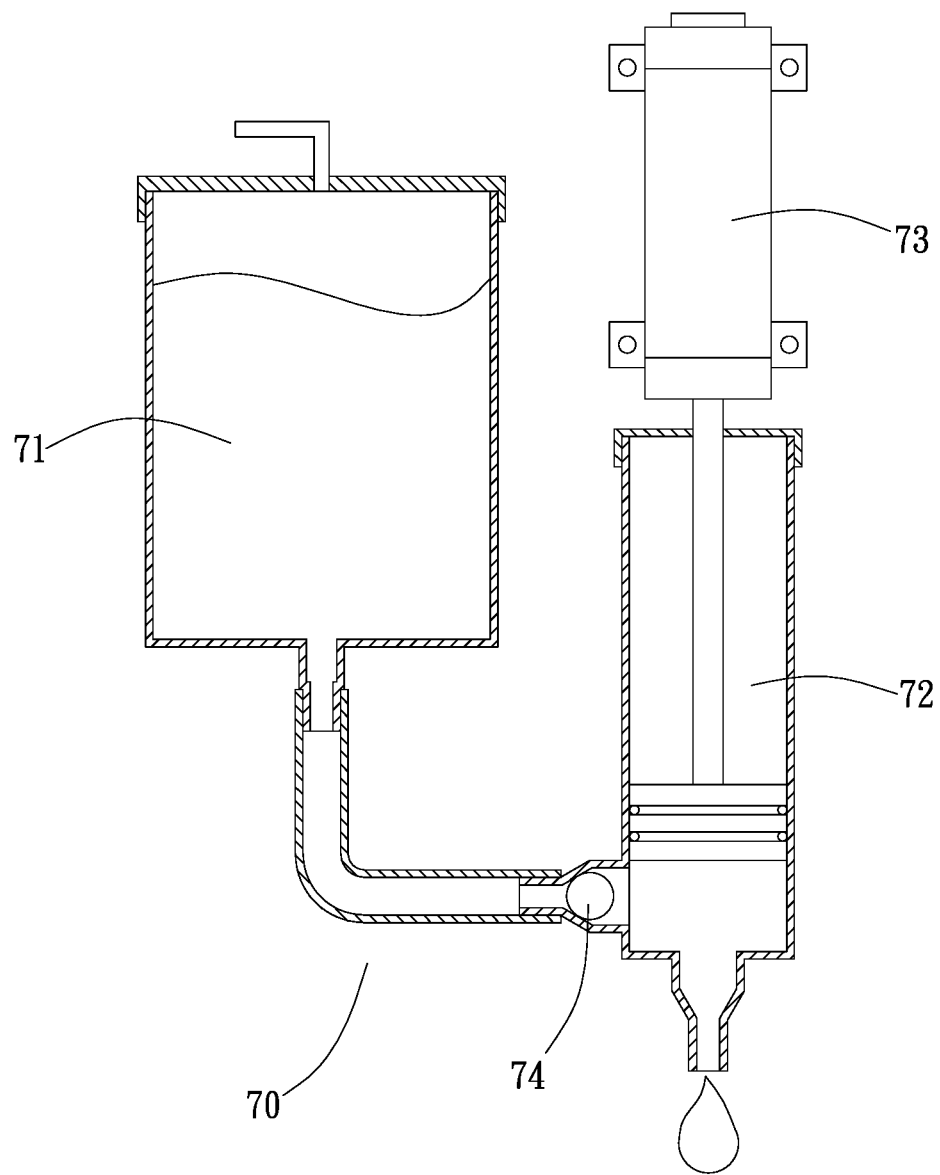
FIG. 18 is a schematic view of a preferred embodiment of the liquid feeding device of the present invention.
Figure 19:
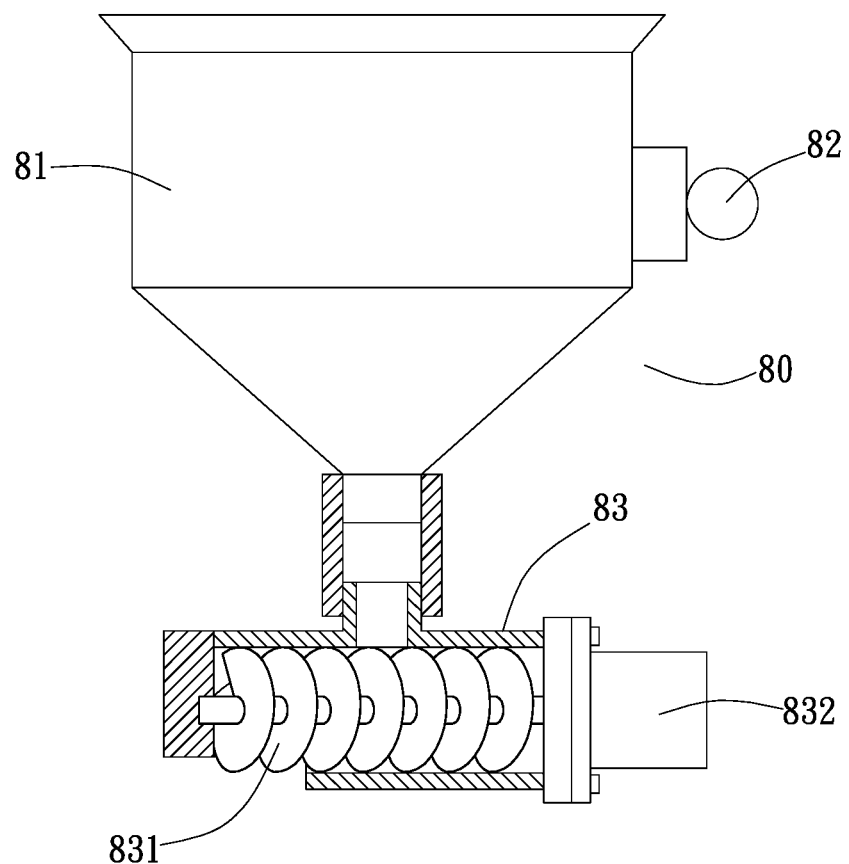
FIG. 19 is a schematic view illustrating the arrangement of the replaceable auger rod and fifth motor of the auger and the solid feeding device.
Figures 20A, 20B:
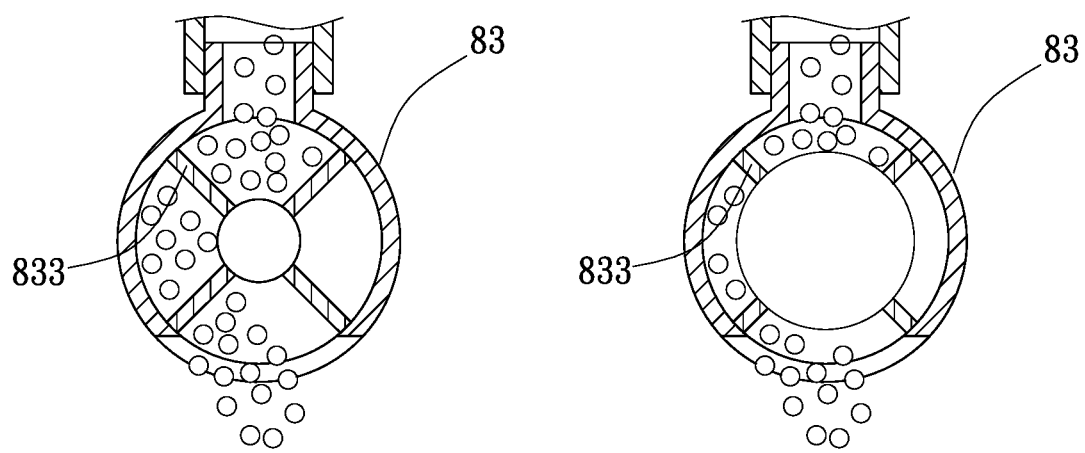
FIG. 20A is a schematic view illustrating the arrangement of a separate dosing rod of a large push space specification.
FIG. 20B is a schematic view illustrating the arrangement of a separate dosing rod of a small push space specification.

The above-mentioned plurality of feeding station areas S1 and feeding preheating station areas S11 of the present invention are used for putting liquid and solid food materials or preheating at the same time. For the purpose of fully automated feeding, the preferred embodiment of the present invention further comprises a liquid feeding device 70 (as shown in FIG. 18) and a solid feeding device 80 (as shown in FIG. 19) disposed at each feeding station area S1 and each feeding preheating station area S11 (as shown in FIG. 19). The liquid feeding device 70 comprises a liquid container 71 for containing edible oil, sauce, soup or water, a pump 72 connected to the liquid container 71 through a tube and a check valve 74, and an electric cylinder 73 for driving the pump 72 to make a linear motion. Thereby, when the operation to the feeding station area S1 or the feeding preheating station area S11 is suspended, the pump 72 can be pumped by the precisely controlled electric cylinder 73 to suck the liquid in the liquid container 71, and then to quantitatively squeeze the sucked liquid into the heating container 22. The solid feeding device 80 mainly comprises a material barrel 81 for storing solid food materials or seasonings, a vibration motor 82 coupled to the material barrel 81, and an auger 83 connected to the bottom of the material barrel 81. The auger 83 comprises a replaceable auger rod 831, and a fifth motor 832 for driving the auger rod 831 to rotate. The auger rod 831 can be replaced with an existing separate dosing rod 833, which can be of a large push space specification (as shown in FIG. 20A), or a small push space specification (as shown in FIG. 20B), in response to different quantitative ingredients and seasonings.

Figure 21:
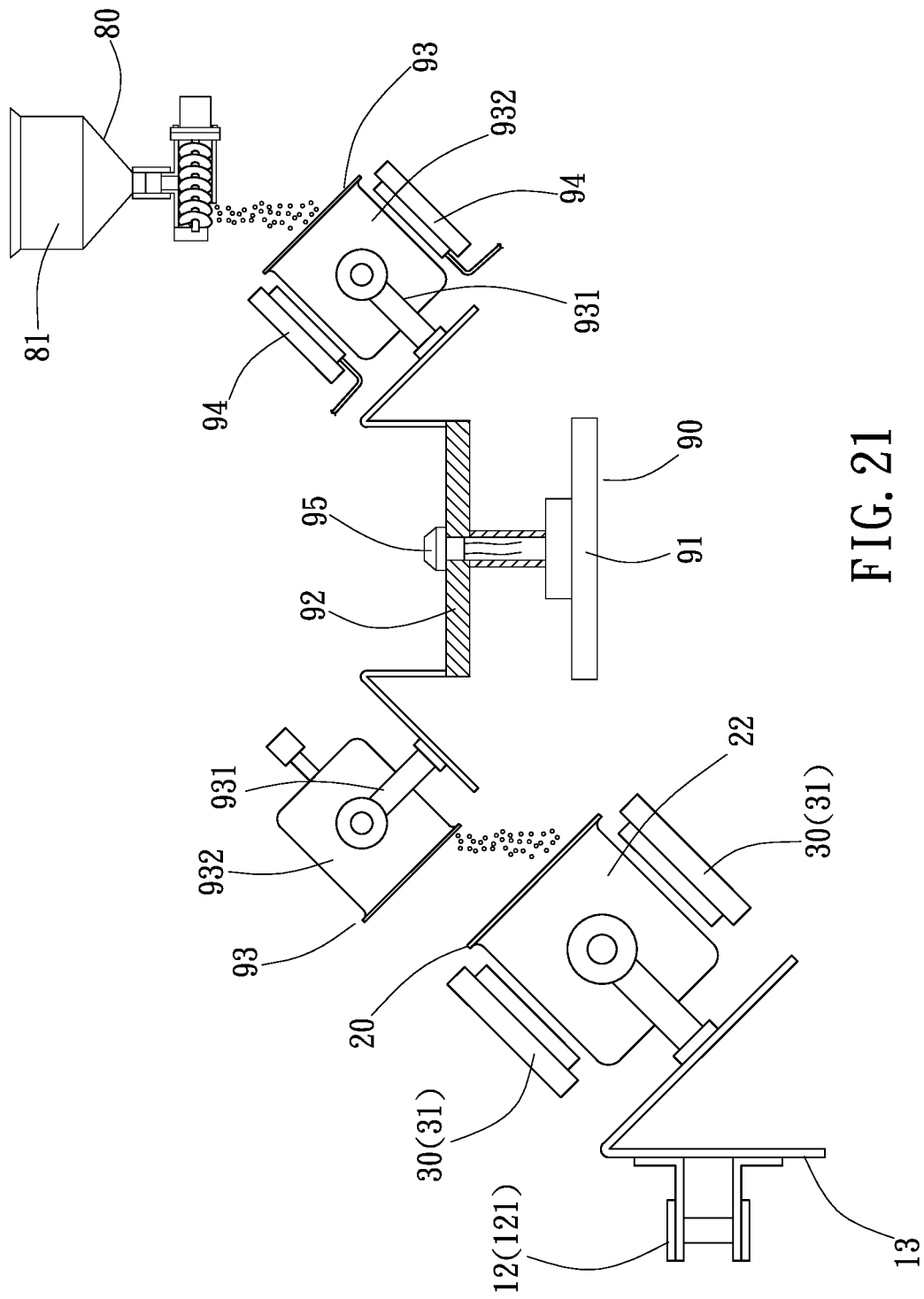
FIG. 21 is a schematic view illustrating the structure of the pre-cooking system.

In addition, referring to FIG. 21, the present invention preferably further implements a pre-cooking system 90 disposed in the feeding station areas S1, the feeding preheating station areas S11 and/or the heating station areas S2. The pre-cooking system 90 mainly comprises an indexing seat 91, a turntable 92 disposed on the indexing seat 91, a pre-cooking device 93 disposed on the turntable 92, a heating device 94 and a circuit adapter 95. The pre-cooking device 93 can be constructed in the same manner as the cooking device 20 described above, comprising a swivel mechanism 931 and a heating container 932 incorporated in the swivel mechanism 931. The power supply circuit of the pre-cooking device 93 is electrically connected to the circuit adapter 95. The arrangement of the circuit adapter 95 prevents tangling of the power supply line when the turntable 92 is rotated. Therefore, the present invention can pre-cook a special seasoning. Thereafter, the cooked food material is poured into the heating container 22 in the feeding station area S1, feeding preheating station area S11 or heating station area S2 by the pre-cooking device 93. Therefore, the fully automated cooking system of the present invention is capable of cooking more flavored meals.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fully automated cooking system, comprising:
   a mobile transport device comprising a drive wheel set, a circulating conveyor belt extending around said drive wheel set and a plurality of brackets disposed on said circulating conveyor belt, said drive wheel set driving said circulating conveyor belt to rotate, said circulating conveyor belt carrying said brackets to make a horizontal loop movement;
   a station area system defining a feeding station area, a heating station area, a discharging station area and a cleaning station area at different locations;
   a plurality of cooking devices respectively mounted on said brackets, each said cooking device comprising a swivel mechanism disposed on one respective said bracket and a heating container connected to said swivel mechanism, said cooking devices being driven by said brackets to move horizontally between said station areas of said station area system, said swivel mechanism being adapted for driving said heating container connected thereto to flip cooked food at said discharging station area; and a plurality of heating devices set in said heating station area of said station area system, said plurality of heating devices each being selectively an electric heating device or a fuel gas heating device and adapted for transferring heat to each said heating container passing through said heating station area to cook ingredients in said heating container.

2. The fully automated cooking system as claimed in claim 1, wherein said drive wheel set comprises a base frame, a plurality of rotating shafts rotatably mounted in said base frame, a first motor coupled to said rotating shafts, and a plurality of sprockets respectively mounted on said rotating shafts; and said circulating conveyor belt is a chain wound around said sprockets; said brackets are fastened to said chain.

3. The fully automated cooking system as claimed in claim 2, wherein said base frame is provided with an adjustment device for adjusting spacing between said rotating shafts.

4. The fully automated cooking system as claimed in claim 2, further comprising a pre-cooking system installed in said feeding station area, said pre-cooking system comprising an indexing seat, a turntable disposed on said indexing seat and a pre-cooking device disposed on said turntable, said pre-cooking device being adapted to pour pre-cooked ingredients into said heating container passing through said feeding station area.

5. The fully automated cooking system as claimed in claim 1, further comprising a power supply system for providing electrical power to said cooking devices, said power supply system comprising a track disposed in parallel to said circulating conveyor belt, two electric strips arranged on said track, and a conductive device mounted on each said bracket, said conductive device comprising a lever pivotally mounted on the respective said bracket, a copper conductive wheel disposed on one end of said lever, and an elastic member acting on said lever to force said copper conductive wheel into contact with said electric strips in a rotatable manner.

6. The fully automated cooking system as claimed in claim 1, wherein said swivel mechanism comprises two cantilevers disposed on the respective said bracket, a flip frame disposed between said two cantilevers, a second motor for driving said flip frame, a third motor disposed on said flip frame; said heating container is rotatably mounted on said flip frame and driven by said third motor to rotate on an axis thereof.

7. The fully automated cooking system as claimed in claim 1, wherein said swivel mechanism comprises a cantilever disposed on the respective said bracket, and a fourth motor disposed on said cantilever; said heating container is rotatably mounted on said cantilever and drivable by said fourth motor to discharge the food.

8. The fully automated cooking system as claimed in claim 1, further comprising a range hood, said range hood comprising a fume hood surrounding said circulating conveyor belt.

9. The fully automated cooking system as claimed in claim 8, further comprising a cleaning system installed in said cleaning station area, said cleaning system comprising a water spray pipe and a jet pipe facing each said heating container passing through said cleaning station area.

10. The fully automated cooking system as claimed in claim 1, further comprising a cleaning system installed in said cleaning station area, said cleaning system comprising a water spray pipe and a jet pipe facing each said heating container passing through said cleaning station area.

11. The fully automated cooking system as claimed in claim 1, further comprising a liquid feeding device and a solid feeding device installed in said feeding station area, wherein said liquid feeding device comprises a liquid container for containing edible oil, sauce, soup or water, a pump connected to said liquid container and an electric cylinder for driving said pump to make a linear motion; and said solid feeding device comprises a material barrel for storing solid food materials, a vibration motor coupled to said material barrel and an auger connected to a bottom of said material barrel.

12. The fully automated cooking system as claimed in claim 1, further comprising a pre-cooking system installed in said feeding station area, said pre-cooking system comprising an indexing seat, a turntable disposed on said indexing seat and a pre-cooking device disposed on said turntable, said pre-cooking device being adapted to pour cooked ingredients into said heating container passing through said feeding station area.

* * * * *